United States Patent [19]
Wells

[11] B  3,993,608
[45] Nov. 23, 1976

[54] POLY(URETHANE-ISOCYANURATE) FOAMS CONTAINING HOLLOW GLASS SPHERES

[75] Inventor: James N. Wells, Cottage Grove, Minn.

[73] Assignee: Minnesota Mining and Manufacturing Company, St. Paul, Minn.

[22] Filed: June 27, 1974

[21] Appl. No.: 483,762

[44] Published under the second Trial Voluntary Protest Program on February 10, 1976 as document No. B 483,762.

[52] U.S. Cl. .......................... 260/2.5 AW; 252/182; 260/2.5 AG; 260/2.5 AK; 428/423; 428/425; 428/427

[51] Int. Cl.² .................. C08G 18/14; B32B 27/40; C09K 3/00

[58] Field of Search ................ 260/2.5 AK, 2.5 AW, 260/2.5 AG; 161/190, 161; 428/423, 425, 457; 252/182

[56] References Cited
UNITED STATES PATENTS

| 3,365,315 | 1/1968 | Beck et al. ...................... 260/2.5 AK |
| 3,510,392 | 5/1970 | D'Eustachio et al. ......... 260/2.5 AK |
| 3,524,794 | 8/1970 | Jonnes et al. .................. 260/2.5 AK |
| 3,585,157 | 6/1971 | Beck ............................... 260/2.5 AW |
| 3,644,168 | 2/1972 | Bonk et al. ..................... 260/2.5 AW |
| 3,801,421 | 4/1974 | Allen et al. ..................... 260/2.5 AW |
| 3,814,659 | 6/1974 | Nadeau ......................... 260/2.5 AW |

FOREIGN PATENTS OR APPLICATIONS

| 2,034,171 | 1/1971 | Germany ...................... 260/2.5 AW |
| 843,841 | 8/1960 | United Kingdom .......... 260/2.5 AW |
| 1,223,415 | 2/1971 | United Kingdom .......... 260/2.5 AW |

*Primary Examiner*—H.S. Cockeram
*Attorney, Agent, or Firm*—Alexander, Sell, Steldt & DeLaHunt

[57] ABSTRACT

Novel poly(urethane-isocyanurate) foams and their preparation are described. These foams contain hollow glass spheres and are tough, non-friable and heat stable. Energy absorbing panels are also provided.

12 Claims, 5 Drawing Figures

U.S. Patent  Nov. 23, 1976  Sheet 1 of 2  3,993,608
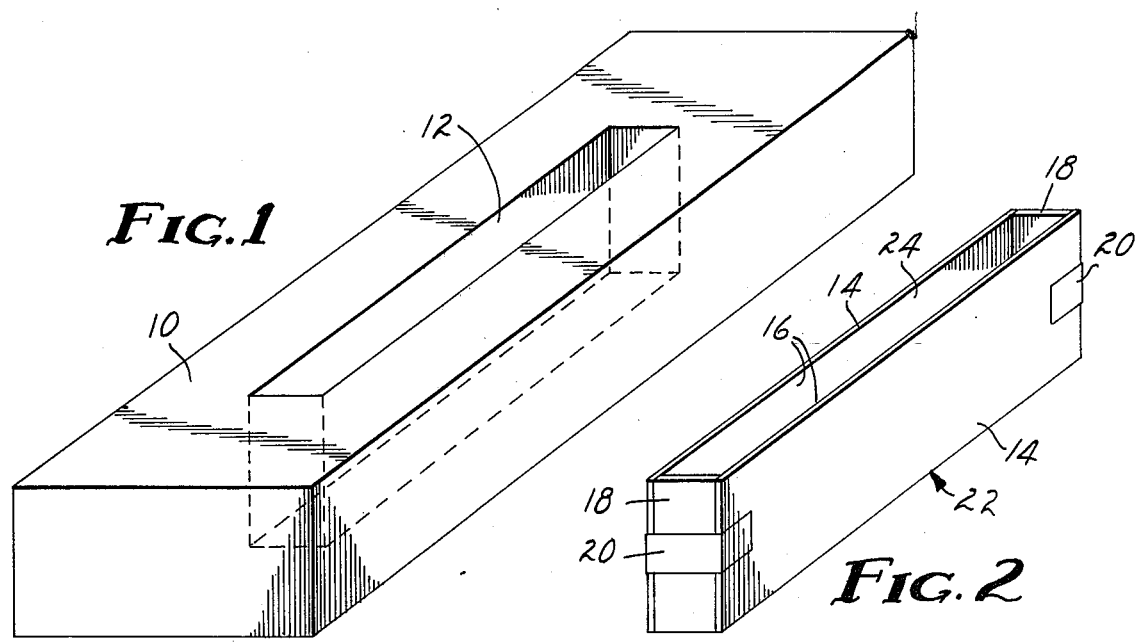
Fig. 1
Fig. 2
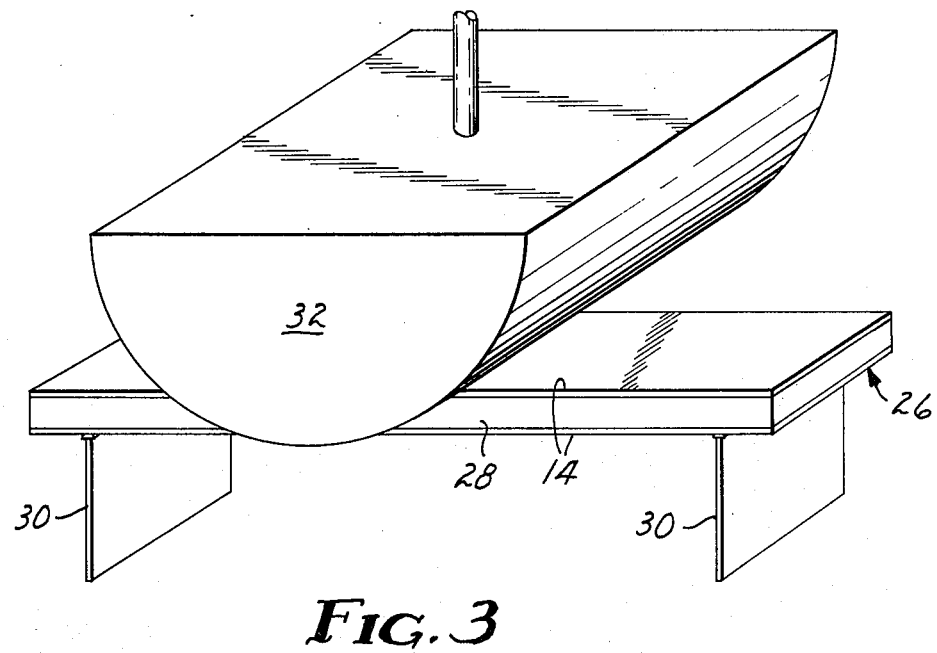
Fig. 3
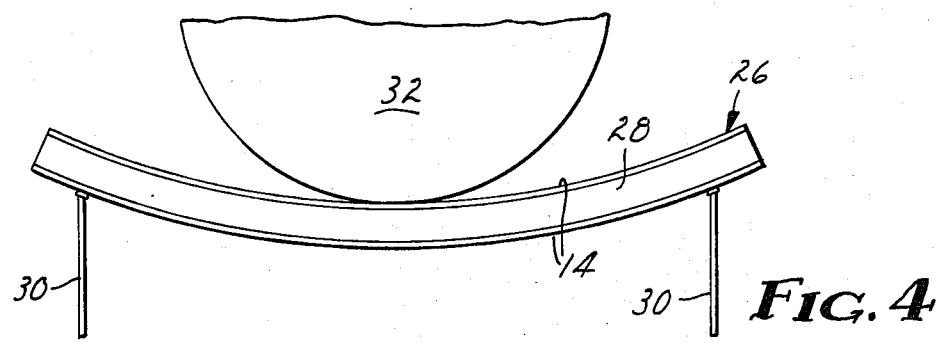
Fig. 4

POLY(URETHANE-ISOCYANURATE) FOAMS CONTAINING HOLLOW GLASS SPHERES

FIELD OF THE INVENTION

This invention relates to poly(urethane-isocyanurate) foams and their preparation. In another aspect, this invention relates to a structural laminate and its preparation.

BACKGROUND OF THE INVENTION

Polyurethanes and polyisocyanurates are known generally in the art as being polyisocyanate-derived polymeric products. These products can be foamed or non-foamed, the former type receiving significant interest as an insulative and cushioning material in many and various industries during the past few years. The foamed polyurethanes are generally prepared by reacting the polyisocyanate with the polyol in the presence of a blowing agent (e.g., a normally gaseous fluorocarbon or carbon dioxide), the blowing agent expanding the reaction product during the reaction to produce a foamed or cellular structure. The polyurethane foams are characteristically and inherently non-heat-stable. Foamed polyisocyanurates are generally produced by reacting polyisocyanates in the presence of a trimerization catalyst and a blowing agent, the isocyanurate moiety imparting greater stability to the polymer. Where the polyisocyanate is a urethane prepolymer, or where it is trimerized in the presence of polyol, the resulting polymer contains urethane as well as isocyanurate linkages. The foamed products can be of high or low density, depending upon the amount of blowing agent used, and either rigid or flexible, depending upon the particular reactants used.

These foams can be generally referred to as poly (urethane-isocyanurates) or as urethane-modified polyisocyanurate foams. It is within the field of urethane-modified polyisocyanurate foams (sometimes referred to herein as polyisocyanurate foams) that the present invention resides.

Although semi-rigid and rigid polyisocyanurate foams (i.e., those having a high percentage of isocyanurate linkages) have generally better heat stability and structural strength than conventional polyurethane foams, the polyisocyanurate foams are characteristically friable and accordingly are not generally useful in energy absorbing panels. Similarly, such foams are not generally useful as structural members because of their friability and/or brittleness. Conventional urethane-modified polyisocyanurate foams tend to be less brittle and friable but also tend to exhibit less heat stability and also tend to be too low in strength to permit their use in structural members. Although these foams generally exhibit improved strength at higher densities, the attendant cost and weight considerations render use of such foams impractical.

Although there has recently been provided a urethane-modified polyisocyanurate foam with improved heat-stability and adhesion to oil-contaminated substrates, such foams do not exhibit the high levels of structural strength and energy absorption properties needed for certain applications. Also, such foams at higher densities do not exhibit the heat-stability required for certain applications.

There has now been discovered, however, certain poly(urethane-isocyanurate) foams which exhibit even further improved heat-resistance, compression and flexural strength and energy-absorption characteristics, which makes such foams especially suitable for use in energy absorbing structures and load bearing structures.

SUMMARY OF THE INVENTION

In accordance with the invention there are provided tough, non-friable poly(urethane-isocyanurate) foams which contain hollow glass spheres and which are particularly useful in structural applications where impact resistance or energy absorption characteristics are required, e.g., as reinforcement means in structural panels, such as automobile doors, or as structural members. These foams exhibit very desirable heat stability and toughness not heretofore known to be obtainable with poly(urethane-isocyanurate) foams. The novel foams also have special utility in applications where the foamed product must adhere to substrates (e.g., metal) contaminated with oil, grease, drawing compounds or the like. Surprisingly the foams of this invention, when formed in situ, adhere tenaciously to such oil-contaminated substrates without the use of a conventional foam stabilizer.

The novel products are poly(urethane-isocyanurate) foams comprising a continuous phase or matrix of a reaction product and, within said continuous matrix, a discontinuous phase of hollow glass spheres having an average diameter of 5 to 500 microns. The reaction product is formed by the reaction of organic polyisocyanate and organic polyol in the presence of isocyanate trimerization catalyst and blowing agent, the NCO/OH equivalent ratio being 1.2/1 to 2.5/1, and the average molecular weight of the polyol being in the range of 600 to 1500. The polymeric reaction product has isocyanate-derived linkages consisting essentially of isocyanurate and urethane linkages; and the crosslink density of the reaction product is in the range of about one crosslink per 400 to 800 atomic weight units. The glass spheres represent about 2 to 20 percent by volume of said foam. The foam has a density in the range of 10 pounds per cubic foot to 20 pounds per cubic foot, and the foam exhibits a "beam flexural modulus" at least as great as that calculated from the formula $\mathrm{Log}_{10}F = (0.05229)D + 4.9542$ where $F$ is the beam flexural modulus in pounds per square inch and $D$ is the density of the foam in pounds per cubic foot.

The isocyanurate linkages in the foamed polymer result from the trimerization of isocyanate moieties, and the urethane linkages result from the reaction of the isocyanate moieties with the hydroxyl moieties of the polyol. The combined isocyanurate and urethane linkages comprise approximately 90 percent of all the linkages in the foamed polymer, the remaining linkages comprising mainly urea (resulting from the reaction of the isocyanate moieties with water), biuret, and allophanate linkages.

The beam flexural modulus, defined in detail later in this application, is a measure of the combined effect of the tensile strength, compression strength, flexural strength, shear strength and adhesion properties of the poly(urethane-isocyanurate) foam containing hollow glass spheres in a defined sandwich panel construction.

Surprisingly, firm bonds of the novel foamed products to oil-contaminated substrates are obtained without the use of a foam stabilizer when forming the foamed product. Of course, the foamed products of this invention will also adhere firmly to non-contaminated substrates when foamed in situ. In another mode of preparation the novel products are prepared by foaming the precursor reaction mixtures thereof in the presence of certain surface active agents which function as foam stabilizers.

If a foam stabilizer is desired, one useful class thereof comprises fluorine-containing compounds having a plurality of active hydrogen atoms. These fluorine-containing compounds can be described as fluoroaliphatic-radical-substituted active hydrogen-containing compounds. Another class of useful foam stabilizers comprises certain silicone compounds which can be described as polysiloxane polyalkyleneoxide copolymers.

Although others have suggested that glass spheres can be added to or incorporated in solid polyurethane elastomers and high density foams (i.e., typically 25 to 40 pounds per cubic foot) to reduce weight without significantly affecting mechanical properties, for many applications this weight reduction is not sufficient. Furthermore, addition of glass spheres to foams having a density less than about 20 pounds per cubic foot was not believed to be worthwhile because the majority of the available polymer is known to be present in the form of thin cell walls. Accordingly, it would not be expected that the polymer in the thin walls would be sufficient to properly bind the glass spheres and, thus, such glass spheres would not be expected to significantly improve the mechanical properties of such low density foams. The foams of the present invention are of low density and exhibit excellent mechanical properties not suggested by the prior art.

Detailed Description of the Invention

In making poly(urethane-isocyanurate) foams in accordance with this invention, precursor reaction mixtures are used. The precursor reaction mixtures comprise organic polyisocyanate, organic polyol, isocyanate trimerization catalyst, blowing agent, hollow glass spheres, and, if desired, a foam stabilizer. These reaction mixtures are ordinarily provided as two-part compositions, "Part A" normally comprising polyol, catalyst, hollow glass spheres, foam stabilizer (if used) and blowing agent, with "Part B" normally comprising the polyisocyanate. Depending upon solubility, the foam stabilizer (if used) may be contained in Part B rather than in Part A. For purposes of this application the "blowing agent" may comprise nothing more than a small amount of a volatile inert liquid (e.g., fluorocarbon) dissolved in one or more of the reactants (e.g., in the polyol or in the polyisocyanate). Also, it may be a material which reacts with the polyisocyanate to produce a gas (e.g., water), in which case it would be dissolved in the polyol. Ordinarily the blowing agent comprises a small amount (e.g., 0.1 percent by weight of the reaction mixture) of water.

The organic polyisocyanates which are useful in making the foamed poly(urethane-isocyanurate) products are any of a wide variety including aromatic, aliphatic and cycloaliphatic diisocyanates and combinations of these types. The aromatic diisocyanates include 2,4-toluene diisocyanate, mixtures thereof with 2,6-toluene diisocyanate (usually about 80/20 by weight, respectively), methylene bis(4-phenylisocyanate), m-phenylene diisocyanate, 3,3'-dimethyl-4,4'-diphenylene diisocyanate, 3,3'-dimethoxy-4,4'-bisphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate. Arylene diisocyanates, i,e., those in which two isocyanate groups are attached directly to an aromatic ring, are preferred. The diisocyanates may contain other substituents, although those which are free from reactive groups other than the two isocyanate groups are ordinarily preferred. In the case of the aromatic compounds, the isocyanate groups may be attached either to the same or to different rings. The preferred polyisocyanates are either the commercially available mixture of toluene diisocyanates which contains 80% 2,4-toluene diisocyanate and 20% 2,6-toluene diisocyanate or 4,4'-methylene bis(phenylisocyanate). Commercially available polymeric aromatic isocyanates having an NCO functionality greater than 2.0 are also quite useful.

Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate are suitable as are alicyclic compounds such as 1,2-and 1,4-cyclohexylene diisocyanates and 4,4'-methylene-bis-(cyclohexylisocyanate).

Suitable organic polyols useful for making the foamed products of the invention include hydroxy, thiol, and amine (primary and secondary) terminated polymers having a molecular weight in the range of 600 to 1,500. Typical polymer backbones include certain polyethers, polyepihalohydrins, polythioethers, polysulfides, and polyesters.

Illustrative polyethers are the following: poly(oxypropylene) glycols, poly(oxypropylene)-poly(oxyethylene) copolymers wherein the poly(oxyethylene) is less than about 10% by weight of the backbone, and poly-(oxytetramethylene) glycols.

Thiol terminated poly(oxyalkylene) glycols usually prepared by the acid-catalyzed condensation of thiodiethyleneglycol with itself (i.e., homopolymers of thiodiethyleneglycol) or at elevated temperatures with formaldehyde, paraformaldehyde, etc., or with polyols such as 1,4-butanediol. Polymers of this type with molecular weights of at least 750 are described in U.S. Pat. No. 2,900,368.

Hydroxy-terminated polysulfides such as are disclosed in U.S. Pat. No. 3,168,119, may also be employed in the practice of this invention.

Other suitable polysulfides are the liquid mercaptoterminated polysulfides such as are disclosed in Patrick et al, U.S. Pat. No. 2,466,963.

Exemplary hydroxy terminated polyesters are polyethylenepropylene adipate, polyethylene adipate, polyethylene adipate (70)-phthalate (30), and polyneopentyl sebacate.

The polyol used can be a single compound or a mixture of two or more polyols. The preferred polyols can be prepared by reaction of a 1,2-alkylene oxide with a simple di- or polyhydroxy compound, such as ethylene glycol, propylene glycol, butylene glycol, hexane diol, glycerine, hexane triol, trimethylolpropane, diethylene glycol, pentaerythitol, or sorbitol.

In formulating the reaction mixtures for the foamed products described in this invention it is preferred to use a polyoxyalkylene polyol in which at least 95% of the oxyalkylene groups are oxypropylene groups, and having an equivalent weight in the range of 300 to 700.

When mixtures of two or more polyols are used (e.g., two or more diols, diols plus triols, two or more triols) in formulating reaction mixtures the number average molecular weight of the polyol mixture is in the range of 600 to 1,500 and the equivalent weight is in the range of 300 to 700.

It has been found that in order to obtain the tough polymeric reaction products needed in this invention which have the proper crosslink density, the NCO/OH equivalent ratio of the reaction mixture must be in the range of about 1.2/1 to 2.5/1. More preferably the NCO/OH ratio is in the range of 1.4/1 to 1.8/1. In calculating the NCO/OH ratio, the water present in the reaction mixture as well as the polyol is considered.

It is highly preferred that the crosslink density of the foamed polymeric reaction products be in the range of about 1 crosslink per 400 to 800 atomic weight units in order to obtain the tough, non-friable, heat-stable foams in accordance with this invention. It is even more preferred to have the crosslink density in the range of about 1 crosslink per 450 to 650 atomic weight units. In calculating the crosslink density for a given foam certain assumptions, of course, are made in accordance with conventional practices in the polyurethane and polyisocyanurate fields. These assumptions are: (1) essentially all of the water present in the reaction mixture reacts in the amount of one mole of water with two moles of isocyanate, (2) essentially all of the hydroxyl groups from the polyol react with isocyanate moieties in the making of the foamed product, and (3) essentially all of the remaining isocyanate groups react to form the isocyanurate linkages.

Crosslink density is defined as the total weight of the reactive components in the reaction mixture (in grams) divided by the total number of crosslink sites in the mixture. The number of crosslink sites is determined by the number of functional groups per gram-mole of each reactive species in the mixture in excess of two; e.g., diols and water provide no crosslinking sites; triols, triisocyanates and isocyanurate rings each provide 1 crosslinking site per gram-mole of material. Catalysts, foam stabilizers, fillers, and unreactive blowing agents are ignored in these calculations.

The hollow glass spheres used in the products of this invention may range in diameter from about 5 to about 500 microns and have an average particle density of about 0.1 to 0.75 grams per cubic centimeter. These glass spheres may be fused water-insoluble alkali metal silicate based glass of the type shown in Veatch, U.S. Pat. No. 2,978,340, although preferably the glass spheres are formed from a soda-lime-silica glass of the type generally used in window panes, etc. These preferred glass spheres are commercially available from 3M Company under the designations "B-25-B", "B-30-B", "B-40-B", etc. Preferably the glass spheres are of a size such that 90% by volume of such spheres are between 2 microns and 130 microns in diameter (average particle density of 0.2 to 0.4 grams per cubic centimeter).

The amount of hollow glass spheres used in the products of this invention is such that the spheres represent about 2 to 20 percent by volume of the final foamed product. Generally speaking, the glass spheres are in the range of about 5 to 30 weight percent based on the total weight of the cured foam product.

Foam stabilizers which may be used, if desired, in making foams in accordance with this invention include (a) fluorine-contaiaing compounds having a plurality of active hydrogen atoms, and (b) polysiloxane polyalkyleneoxide copolymers.

The class of fluorochemical foam stabilizers which are particularly useful in the practice of this invention can be described in terms of the formula:

$$(R_f)_m Q_z (H)_n \qquad \text{I}$$

where $R_f$ is a fluorinated, saturated, usually monovalent, aliphatic radical, H is an active hydrogen atom, present as part of a functional group, such as hydroxyl, amino, imino, mercapto, carboxyl, and phosphate, Q is a linkage or bridge free of active hydrogen atoms and having a valence equal to $m + n$, $m$ being an integer which is at least 1 and can be as high as 6 or higher, $n$ being an integer of at least 2 and can be as high as 5 or higher (e.g., as high as 100), and $z$ is an integer of 1–3.

The term "active hydrogen atom" as used in this application means a hydrogen atom (other than an amido hydrogen atom) which is reactive with a Grignard reagent as described in J. Am. Chem. Soc., 49, 3181, 1927. Amido hydrogen atoms, such as those present in —SO$_2$NH— and —CONH—, are difficult to react with the isocyanate moiety under conditions of casting and bonding and therefore are not considered as active hydrogen atoms for purposes of this invention.

Fluorochemical foam stabilizers of this type, and the manner of their preparation, are described in assignee's copending application Ser. No. 20,012, incorporated herein by reference.

The preferred class of fluorine-containing compounds used as foam stabilizers in this invention, and coming within Formula I above, can be described as fluoroaliphatic radical-substituted poly(oxyalkylene) polyols. These compounds can be expressed in terms of the formula:

$$(R_f)_m Q_z [(RO)_x H_y]_n \qquad \text{II}$$

where $R_f$ is a fluorinated, saturated, usually monovalent, aliphatic radical, R is a polyvalent, and usually divalent, saturated aliphatic hydrocarbyl radical having 2 to 10 carbon atoms (preferably 2 to 3 carbon atoms), such as derived from ethylene or 1,2-propylene oxides, H is an active hydrogen atom, Q is a linkage or bridge free of active hydrogen atoms and having a valence equal to $m + n$, $m$ being an integer which is at least 1 and can be as high as 6 or higher, $n$ being an integer of at least 1, and usually is 2, or can be as high as 5 or higher, $z$ is an integer of 1–3, $x$ is an integer of at least 25 and can be as high as 400 or higher, and $y$ is an integer of 1–5, and preferably 1 to 3, the product $(n)(y)$ being at least 2.

The fluoroaliphatic radicals, $R_f$, of the foam stabilizers are stable, inert, non-polar moieties which are both oleophobic and hydrophobic. They can be straight chain, branched chain, and, if sufficiently large, cyclic, or combinations thereof, such as alkylcycloaliphatic radicals. The skeletal chain can include catenary oxygen and/or trivalent nitrogen hetero atoms bonded only to carbon atoms, such hetero atoms providing stable linkages between fluorocarbon groups and not interfering with the inert character of the $R_f$ radical. While $R_f$ can have a large number of carbon atoms, compounds where $R_f$ is not more than 20 carbon atoms will be adequate and preferred since large radicals usually represent a less efficient utilization of fluorine than is possible with smaller $R_f$ radicals. Generally, $R_f$ will have 4 to 20 carbon atoms, preferably 6 to about 12, and will contain 40–78 weight percent, preferably 50–78 weight percent, of fluorine. The terminal portion of the $R_f$ group has preferably at least three fully fluorinated carbon atoms, e.g., $CF_3CF_2CF_2$—, and the preferred foam stabilizers are those in which the $R_f$ group is fully or substantially completely fluorinated, as in the case where $R_f$ is perfluoroalkyl, $C_nF_{2n+1}$.

Generally, the foam stabilizer will contain about 4 to 25 weight percent, preferably about 6 to 18 weight percent, of carbon-bonded fluorine. If the fluorine content is less than about 4 weight percent, impractically large amounts of the foam stabilizer will generally be required, while fluorine contents greater than about 25 weight percent are unnecessary to achieve foam stabilization and thus represent an uneconomical use of fluorine.

The function of the linkage or bridge Q is to bond the fluoroaliphatic radicals, $R_f$, to the polyether moieties, $(RO)_xH_y$, of the compound. Q can be a valence bond, in which case a carbon atom of a fluoroaliphatic radical is bonded or linked directly to a polyether moiety. Q can also comprise one or more linking groups such as polyvalent aliphatic, e.g., $—CH_2CH_2—$ and $—CH_2CH(CH_2—)_2$, polyvalent aromatic, e.g.,

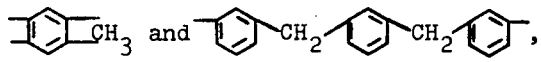

oxy, thio carbonyl, sulfone, sulfoxy, imino, e.g., $—NH—$ and $—N(C_2H_5)—$, and combinations thereof, such as oxyalkylene, iminoalkylene, iminoarylene, sulfonamido, carbonamido, sulfonamidoalkylene, carbonamidoalkylene, urethane, e.g., $—CH_2CH_2OCONH—$ and

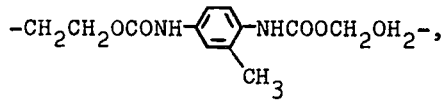

and urea, e.g., $—NHCONH—$.

The linkage Q for a specific compound useful as a foam stabilizer will be dictated by the ease of preparation of such a compound and the availability of necessary precursors thereof.

From the above description of Q, it is apparent that this linkage can have a wide variety of structures, and in fact where it is valence bond, it doesn't even exist as a structure. However large Q is, the fluorine content (the locus of which is $R_f$) of the compound is in the aforementioned limits set forth in the above description. While only one $R_f$ radical is sufficient to produce foamed products with desirable properties, i.e., where $m$ in Formula I is 1, the foam stabilizers can have a plurality of $R_f$ radicals, e.g., $m$ can be 2 to 6, or higher. This plurality of $R_f$ radicals can be spaced along a chain terminating in active hydrogen-bearing polyether moieties. Such compounds can be prepared, for example, by reacting two or more fluoroaliphatic radical-containing compounds, each having a plurality of active hydrogen atoms, with less than a stoichiometric amount of a polyisocyanate and then linking the resulting intermediate product to a polyether polyol. Such resulting polyether polyols containing a plurality of $R_f$ groups have been found to provide effective foam stabilization at lower concentrations than the simple foam stabilizers having only one $R_f$ group.

Preferred foam stabilizers of Formula II which can be used in this invention to make foamed products are fluoroaliphatic radical-substituted poly(oxyalkylene) polyols of the formula:

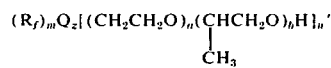

where $R_f$, Q, $m$ and $z$ are as defined for Formula II above, $n'$ is an integer of at least 2 and can be as high as 6 or higher, and a and b designate respectively the number of oxyethylene and oxypropylene units shown in parentheses, and $a + b$ is an integer of at least 5 and can be as high as 400 or higher. The weight ratio of oxyethylene units to oxypropylene units is preferably 20:80 to 80:20. The fluorine content of these compounds is in the aforementioned limits set forth for formula I and the average molecular weights of these compounds is at least 4,500 to 100,000–200,000, or higher.

The fluoroaliphatic radical-substituted poly(oxyalkylene) polyols of Formula III can be obtained by several methods, such as by the oxyalkylation or condensation of ethylene oxide and 1,2-propylene oxide with fluorine-containing compounds having at least one Zerewitinoff active hydrogen atom, e.g., $R_fSO_2N(R')CH_2CH(OH)CH_2OH$, where $R'$ is lower alkyl or hydrogen. Said oxyalkylation can be accomplished by known procedures, e.g., as described in U.S. Pat. No. 2,915,554 (Ahlbrecht and Morin), to produce active hydrogen-terminated copolymer poly(oxyalkylene) chains in which the oxyethylene and oxypropylene units are repeated in a random or block fashion within the chain.

An especially preferred subclass of the fluoroaliphatic radical-substituted polyols of Formula III is that where the poly(oxyalkylene) chain is composed of blocks of oxyethylene and blocks of oxypropylene, particularly where they form compounds of the formula:

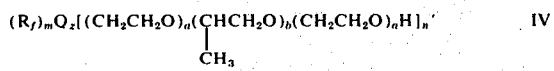

where $R_f$, Q, m, and z are as defined above for Formula I, a, b, and $n'$ are as defined for Formula III, the poly(oxyethylene) to poly(oxypropylene) weight ratio in the poly(oxyalkylene) chains being in the range of 20:80 to 80:20, preferably 40:60 to 60:40. The fluorine content and molecular weight of the compounds are the same as that of Formula III.

A convenient method of preparing the fluoroaliphatic radical-substituted poly(oxyalkylene) polyols of Formula IV is the reaction of precursor fluorine-containing compounds, having one or more active hydrogen atoms, with an excess of an aliphatic or aromatic polyisocyanate, to form isocyanate-terminated adducts or intermediates which are then reacted with poly(oxyalkylene) polyols, such as glycols (the preferred polyols), triols, and tetrols. Reactions between functional groups containing active hydrogen atoms and the isocyanate moiety are well-known (see Sec. III of "Polyurethanes:Chemistry and Technology, Part I, by Saunders and Frisch, Interscience Publishers, 1962). In order to ultimately produce a foam stabilizer with at least two active hydrogen atoms, the isocyanate intermediate must have at least two $—NCO$ groups, and in order to produce such intermediates, the total moles of isocyanate groups in the polyisocyanate reactant must be at least 2 more than the total moles of active hydrogen atoms in the fluoroaliphatic reactant, and the total moles of active hydrogen atoms in the poly(oxyalkylene) polyol reactant must be at least 2 more than the total moles of isocyanate groups in the isocyanate intermediate. By choosing the right poly(oxyalkylene) polyol reactant, i.e., one with the desired molecular weight, the desired fluorine content can be obtained. Typically, the desired fluorine content can be obtained. Typically, the molecular weight of this polyol reactant will be five to ten times as large as that of the fluoroaliphatic precursor.

Representative subclasses of fluoroaliphatic radical-substituted precursors which can be used to form the foam stabilizers include:

$$R_fSO_2NHRCH_2OH,$$

where R is alkylene with 1–12 carbon atoms;

$$R_fSO_2NHRSH,$$

and $$R_fCONHRSH,$$

where R is alkylene with 3–14 carbon atoms;

$$R_fSO_2NR'(RNH)_xRNH_2,$$
$$R_fCONR'(RNH)_xRNH_2,$$
$$R_fSO_2NR'RCONH(RNH)_xRNH_2,$$
$$R_fSO_2NR'RCONH(RO)_xRNH_2, \text{ and}$$
$$R_f(RNH)_xRNH_2,$$

where R' is hydrogen or alkyl with 1–6 carbon atoms, R is alkylene of 2–12 carbon atoms, and x is 1 or greater;

$$R_fSO_2NR'Z(OH)_n$$

where R' is hydrogen or alkyl with 1–12 carbon atoms, Z is aliphatic, aromatic, alicyclic, or arylaliphatic, and n is at least 2;

$$R_fSO_2NH(CH_2)_nNHZ(NH_2)_2,$$
$$R_fSO_2NR'Z(NH_2),$$
$$R_fCONH(CH_2)_mNHZ(NH_2)_2,$$
$$R_f(CH_2)_qOZ(NH_2)_2,$$
$$R_f(CH_2)_qNHZ(NH_2)_2,$$

and their hydrazino analogs, where R' is hydrogen or lower alkyl, Z is a 2,4-substituted triazine ring, n is 1–12, m is 0–12, and q is 1–13;

$$R_fSO_2NH(CH_2)_nCOOH,$$

where m is 1–12;

$$R'_fOCH_2CH(R)OH, \text{ and}$$
$$R'_fO[CH_2CH(R)O]_nCH_2CH(R)OH,$$

where R is hydrogen or methyl and n is an integer of 1 or more, and R'$_f$ is a tertiary fluoroaliphatic radical;

$$R_fSO_2NR(CH_2)_m(OCH_2\overset{R'}{\underset{|}{C}H})_nOH,$$

where R is hydrogen or $$(CH_2)_n(OCH_2\overset{}{\underset{|}{C}H})_nOH,$$
$$R'$$

R' is hydrogen or methyl, m is 2–3, and n is 2–20;

$$R_fQNRR'NH_2$$

where Q is sulfonyl or carbonyl, R is alkyl with 1–6 carbons, and R' is alkylene with 2–13 carbon atoms;

$$R_fRCOOH,$$
$$R_fRCH_2OH,$$
$$R_fQNHRCH_2OH,$$

and $$R_fQNHRCOOH,$$

where Q is sulfonyl or carbonyl, and R is alkylene with 1–18 carbon atoms; and $$(R_f)_mQ(COOH)_n$$

where m and n are integers of 1 or 2.

There are a host of prior art fluorine-containing compounds which have only a single active hydrogen atom. These can be reacted with epoxy alkanols, such as 2,3-epoxy-1-propanol, to form fluorine containing compounds with two active hydrogen atoms (as part of hydroxyl groups) which can be used in this invention to form foam stabilizers which fall within the scope of Formula II.

Specific precursor fluoroaliphatic radical-substituted compounds which can be used to prepare the foam stabilizers representatively include:

$$CF_3(CF_2)_7SO_2N(CH_3)CH_2CH_2OH$$
$$CF_3(CF_2)_3SO_2N(CH_3)CH(CH_3)CH_2OH$$
$$CF_3(CF_2)_7SO_2N(CH_2CH_3)CH_2CH_2OH$$
$$CF_3(CF_2)_3SO_2N(CH_3)CH_2CH(CH_3)OH$$
$$CF_3(CF_2)_7SO_2N(CH_2CH_3)CH_2CH_2OH$$
$$CF_3(CF_2)_9SO_2N(CH_2CH_2CH_3)CH_2CH_2OH$$
$$CF_3(CF_2)_7SO_2N(CH_2CH_2CH_3)CH_2CH_2OH$$
$$CF_3(CF_2)_7SO_2N(CH_2)(CH_2)_5SH$$
$$CF_3(CF_2)_7SO_2N(C_2H_5)CH_2COOH$$
$$CF_3(CF_2)_7SO_2N(C_2H_5)(CH_2)_6OH$$
$$CF_3(CF_2)_7SO_2N(C_2H_5)(CH_2)_{11}OH$$
$$CF_3(CF_2)_7SO_2N(C_4H_9)(CH_2)_4OH$$
$$CF_3(CF_2)_7SO_2N(CH_3)(CH_2)_4OH$$
$$CF_3(CF_2)_7SO_2N(CH_2CH_3)CH_2CH_2NH_2$$
$$[CF_3(CF_2)_7SO_2N(CH_2CH_3)CH_2CH_2]_2NH$$
$$CF_3(CF_2)_7SO_2N(CH_2CH_3)CH_2CH_2N(CH_3)H$$
$$CF_3(CF_2)_7SO_2N(CH_3)CH_2CH_2SH$$
$$CF_3C_6F_{10}C_2F_4SO_2N(CH_3)CH_2CH_2OH$$
$$C_2F_5O(C_2F_4O)_3CF_2CONHC_2H_4OH$$
$$CF_3(CF_2)_7SO_2N(C_3H_7)CH_2OCH_2CH_2CH_2OH$$

$$CF_3CF(CF_2Cl)(CF_2CF_2)_6CF_2CON(CH_3)CH_2CH_2OH$$
$$CF_3CF(CF_2H)(CF_2CF_2)_6CF_2CONHCH_2CH(OH)CH_2OH$$
$$CF_3(CF_2)_7SO_2CH_2CH_2OH$$
$$CF_3(CF_2)_7SO_2N(CH_3)CH_2CH_2SH$$
$$C_7F_{15}CON(C_2H_5)C_2H_4OH$$
$$CF_3(CF_2)_7CH_2CH_2CH_2OH$$

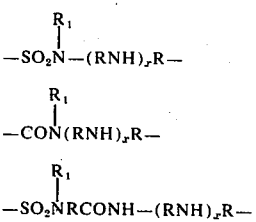

A wide variety of poly(oxyalkylene) compounds having at least one functional group containing active hydrogen can be used to prepare the foam stabilizers of Formula II. Poly(oxyalkylene) polyols with a wide range of molecular weights which are commercially available and can be used for this purpose include, for example, those set forth in Appendix B of Saunders & Frisch, supra. The foam stabilizers of Formula V are conveniently made using the poly(oxyalkylene) polyols which are sold under the trademark "Pluronic", those having molecular weights of 1,500 to 3,000 being particularly suitable.

Another useful class of fluorochemical foam stabilizers which can be used in this invention, and which come within Formula I, supra, are the perfluoroalkyl amines described in U.S. Pat. No. 3,378,399 (Rambosek), the disclosure of which is incorporated herein by reference. These compounds have the formula:

$$R_fWNH_2 \quad\quad V$$

wherein $R_f$ is perfluoroalkyl of 4 to 12 carbon atoms, and W is a linking group such as the following:

$$-SO_2\overset{R_1}{\underset{|}{N}}-(RNH)_xR-$$

$$-CO\overset{R_1}{\underset{|}{N}}(RNH)_xR-$$

$$-SO_2\overset{R_1}{\underset{|}{N}}RCONH-(RNH)_xR-$$

where $R_1$ is hydrogen or alkyl or 1 to 6 carbon atoms, R is alkylene of 2 to 12 carbon atoms, $x$ is 0 or an integer of 1 to 8 or higher, e.g., up to 100 or more, and $y$ is an integer of 1 to 8 or higher.

Representative foam stabilizers of this type which can be used in this invention include:

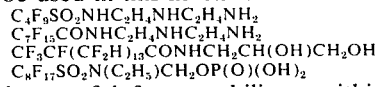

Other useful foam stabilizers within the scope of Formula I, supra, of this invention are disclosed in U.S. Pat. Nos. 3,378,399 (Rambosek), 3,128,272 (Wear et al.), 3,217,035 (LaZerte et al.), 3,478,116 (Smeltz), 3,450,755 (Ahlbrecht), 3,458,571 (Tokoli).

Suitable silicone foam stabilizers used in this invention can be described as polysiloxane polyalkyleneoxide copolymers having a molecular weight in the range of 1,000 to 20,000. Preferably the polyalkyleneoxide portion of the copolymer comprises some amount of ethylene oxide. The copolymers currently preferred for use as foam stabilizers in this invention are dimethyl polysiloxane alkylene oxide copolymers.

Silicone foam stabilizers of the general type described are known in the art. See, for example, British Pat. No. 1,114,428; U.S. Pat. Nos. 2,868,824; 2,846,458; and 3,507,815. Commercially available materials include "SF-1109", a dimethyl polysiloxane alkylene oxide copolymer available from General Electric Co.; "L-540", "L-5202", "L-5410", "L-520", siloxane alkylene oxide copolymers available from Union Carbide.

The particular foam stabilizer and amount thereof chosen for making a foamed product in accordance with this invention will depend upon its solubility in the particular reaction mixture being foamed and will also depend upon the catalyst used. Amounts as high as 20 weight percent, based on the weight of the total reaction mixture, can be used but generally it will be uneconomical and unnecessary to use such high amounts. Usually 0.1 to 5 weight percent of foam stabilizer will provide satisfactory foams with a high percent of uniform cells. Functionally stated, the amount of foam stabilizer to use will be a foam stabilizing amount.

In preparing foamed poly(urethane-isocyanurate) products according to this invention, polyisocyanate and polyol can be reacted in conventional manner, for example, by the so-called one-shot, prepolymer or semi-prepolymer techniques (see "Handbook of Foamed Plastics," by Bender; Lake Publishing Corp. (1965), said reaction being carried out in the presence of trimerization catalyst, blowing agent, and other known adjuvants (e.g., flame retardants such as polyvinyl chloride-antimony oxide compounds), together with one or more foam stabilizers (if desired). As described above, the blowing agent may comprise nothing more than a small amount of a volatile inert liquid dissolved in one or more of the reactants, or it may be a material which reacts with the polyisocyanate to produce a gas (e.g., it could be water).

Preferably the blowing agent used in this invention is water, although halocarbon blowing agents, such as Freon 11 or Freon 12, can be used by themselves or in combination with water. The amount of water used as blowing agent preferably is in the range of 0.1 – 0.4% based on the weight of polyisocyanate, in order to obtain foamed products having a free rise density in the range of 10 to 20 lbs. per cubic foot.

The resulting foamed or cellular product comprises a high percentage of uniform cells or voids and exhibits very desirable physical properties, such as heat stability, toughness, and beam flexural modulus. These foamed products also form very firm bonds to oil and grease contaminated substrates when foamed in situ.

Generally, the organic polyol, catalyst, glass spheres, blowing agent (usually water), and foam stabilizer (if used) will be mixed together batchwise in a stirred container or continuously in a mixing chamber, followed by addition of organic polyisocyanate with mixing. The foamable mixture can then be transferred to a suitable mold or cavity to be filled. The foamable mix can also be applied to large surfaces by spraying. If desired, one or more of the ingredients can be preheated or precooled before mixing takes place. Process conditions, such as temperature, pressure, reaction time, and order of addition will be conventional and are not critical. The foam stabilizer (if used at all) can be premixed with the polyisocyanate component or polyol component, depending on its solubility in these components. For some reaction mixtures or foam stabilizers, it may be desirable to add the foam stabilizer to the reaction mixture or reactant component thereof in a solvated form (e.g., as a solution in a solvent such as methyl ethyl ketone or an alkaline methanol) or to heat the reaction mixture or foam stabilizer, in order to get a better dispersion of the foam stabilizer in the reaction mixture, and thereby produce a foamed product with a higher percentage of uniform small cells.

When using fluorochemical stabilizers of Formula II, supra, or silicone foam stabilizers in accordance with this invention it has been found that the type of isocyanate trimerization catalyst used therewith can vary. For example, the catalyst may be weakly basic (e.g., alkali metal salts of carboxylic acids, such as sodium acetate, potassium acetate, potassium 2-ethylhexoate, sodium benzoate, and the like). Strongly basic catalysts can also be used, e.g., alkali metal hydroxides (such as sodium or potassium hydroxide), alkali metal alkoxides (such as sodium methoxide), and quaternary ammonium hydroxides (such as benzyl trimethylammonium hydroxide). Other suitable catalysts include neutral metal salts of carboxylic acids, e.g., lead octoate, stannous octoate, phenyl mercuric oleate and phenyl mercuric acetate. One may also use, in conjunction with the above-mentioned catalysts, materials such as aliphatic tertiary amines (e.g., 1,4-diazabicyclo [2.2.2] octane), certain organic metal compounds (e.g., dibutyltin dilaurate) and epoxides (e.g., propylene oxide and phenyl glycidyl ether).

The amount of trimerization catalyst used in making suitable foams can vary. Generally, an amount of catalyst in the range of 0.1 – 10 parts per 100 parts of polyisocyanate is suitable, although the amount of catalyst will most usually be in the range of 1–8 parts per 100 parts of polyisocyanate.

When the fluorochemical stabilizers of Formula V, supra, are used in making foamed reaction products in accordance with this invention, it is highly preferred to employ a catalyst which is strongly basic in nature so that the resulting foamed reaction product will have a highly uniform cell structure. Suitable strongly basic catalysts include alkali metal hydroxides, alkali metal alkoxides, and quaternary ammonium hydroxides. Specific example of such catalysts are potassium hydroxide and sodium dipropylene glycolate. The amount of used will generally be in the range of 0.1 – 10 parts per 100 parts of polyisocyanate, and preferably the amount used is in the range of 0.5–5 parts per 100 parts of polyisocyanate.

The poly(urethane-isocyanurate) foams of this invention have primary utility as energy absorbing materials and as load bearing members. For example, the foam may be applied to the surface of a structure by means of adhesive, or by being formed in situ, so as to provide an energy absorbing surface. The foam may also be used as a core material in a panel designed to absorb shock (e.g., as a core material in an automobile door).

The foams may also be formed in a mold for the purpose of providing structural load bearing members (e.g., furniture supports such as legs, arms, etc.). The foam may also be used as a core material in a load bearing panel (e.g., a floor panel, boat deck, beam, pillar, etc.).

The foams also have utility as reinforcement means for thin, poorly supported body shell members such as car hoods, trunk decks, boat hulls, etc.

When a foam is used as a core member in a structural panel, the physical properties of the foam which are most important are: ability to form firm, permanent bonds to the panels; compression strength; tensile strength; and shear strength. Additionally, for high performance energy absorbing panels or for use in structural, load bearing applications, the foam must exhibit good flexural strength and recovery. Because some of these properties are inter-related it is very difficult to set absolute limits for each such property which must be exhibited by the foam. However, a test method has been found which conveniently correlates the abovementioned properties of the foam in a single test and accurately distinguishes foams suitable for use in high performance structural panels (of the energy absorption type) and as structural members from those foams which are not suitable therefor. This test is referred to herein as a "beam flexure test", and the "beam flexural modulus" of a foam sandwich panel can be calculated from measurements taken during the test.

Generally, this test involves (1) placing oil-coated steel panels into a suitable mold or cavity in such manner that a space is defined between the oil-coated panels, (2) casting or pouring into the defined space between the oil-coated panels a reaction mixture of the ingredients used to make the particular foam to be tested (3) allowing the foam to form in situ, (4) removing the so-formed sandwich panel construction; the sandwich panel may be aged under various conditions at this point, (5) placing the sandwich panel in horizontal position on an Instron tensile machine, the sandwich panel being supported near each of its ends with suitable support means, (6) applying increasing force to the center of the top surface of the sandwich panel with the Instron machine, (7) measuring the maximum force and distance beyond which the panel will not spring back or recover its original form, (8) measuring the maximum force needed to buckle or break the sandwich panel, (9) measuring the maximum amount of deflection of the sandwich panel from the horizontal beyond which such panel buckles or breaks, and (10) calculating the beam flexural modulus.

The beam flexure test will now be described in more detail with reference to the accompanying drawings wherein like reference characters refer to the same parts throughout the several views and in which:

FIG. 1 is a perspective view of a mold suitable for making sandwich panel constructions to be tested;

FIG. 2 shows an assembled structure of steel panels yet to be bonded together with foam;

FIG. 3 shows a sandwich panel or laminate in position for testing;

FIG. 4 shows the sandwich panel of FIG. 3 during the performance of the test.

Figure 5:
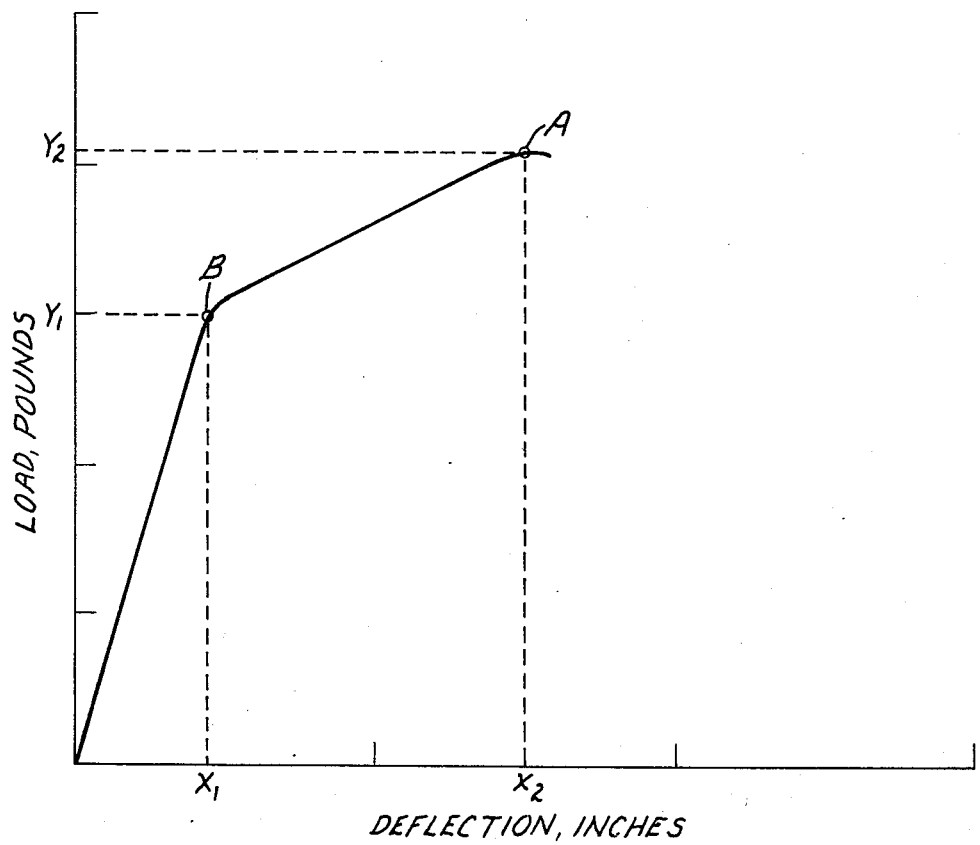
FIG. 5 shows a graph on which load and deflection are plotted for a sandwich panel during the performance of the test.

In FIG. 1 there is shown a wooden block 10 having a rectangular cavity 12 therein. The dimensions of cavity 12 are 20¼ × 4½ × 1⅛ inches.

Before making the sandwich panel construction, a thin (10 mil) polyethylene film (not shown) is first positioned within cavity 12 along the walls thereof. Two cold rolled steel panels (20 × 4 × 0.035 inch; ASTM A366) are then prepared for later positioning within cavity 12 according to the following procedure.

The steel panels are each cleaned thoroughly with methyl ethyl ketone or other suitable solvent followed by coating one major surface of each panel with a liberal amount of a mineral oil (Texaco Almag 1654, a paraffin oil with pour point of +5°F. viscosity of 47 Saybolt Universal Seconds and A.P.I. gravity of 32.) The steel panels are then placed in vertical position to allow excess oil to drain off (approximately 16 hours). The oil remaianing on each steel panel is approximately 0.1 gram.

The oil-contaminated steel panels are then positioned in parallel relationship as shown in FIG. 2, with the oil-contaminated surfaces 16 of the panels 14 facing each other. Two small cold rolled steel end pieces 18 (4 × 0.93 × 0.035 inch) are positioned between panels 14 in the manner shown in order to maintain a fixed distance therebetween, small strips of pressure-sensitive adhesive tape 20 being used to hold end pieces 18 and panels 14 together as shown. Assembled structure 22, having outside dimensions of 20 × 4 × 1 inch, and a cavity 24 therein, is then weighed.

After assembled structure 22 has been weighed, it is positioned within cavity 12 of blcok 10. The precursor reaction mixture of the desired foam to be tested is then poured into the cavity 24 of assembled structure 22. The reaction mixture is allowed to react to form a foamed product in situ, the foamed product forming a bond to surfaces 16 of panels 14. After the foam has stopped rising, another 10 or 20 minutes are allowed to elapse before removing the finished sandwich panel construction from cavity 12. After allowing the sandwich panel construction to age overnight at room temperature the excess foam is trimmed off the panel edges to leave a panel of 20 × 4 × 1 inch. The thickness of the panel is measured with a micrometer (accurate to 0.001 inch) at three points along the panel and then the average thickness is calculated, the three points being the center and approximately 1 inch from each end. This sandwich panel is then weighed and the foam density is calculated.

In FIG. 3 there is shown a sandwich panel 26 prepared according to the foregoing procedure in position for testing. Sandwich panel 26 comprises steel panels 14 being bonded together with foamed polymer 28.

Sandwich panel 26 is shown orizontally supported by supports 30 on an Instron machine. Supports 30 are each positioned 1.5 inches from the ends of panel 26, supports 30 thereby being 17 inches apart. Midway along the top surface of panel 26 increasing downward force is applied thereto with wooden member 32 which is semi-circular in cross-section and has a 6-inch radius.

In FIG. 4 there is shown panel 26 during the performance of the test, panel 26 being deflected as the downward force increases at the rate of 1 inch per minute. While the downward force is applied the Instron machine is connected to a chart recorder which shows the deflection of the panel as the downward force increases. A typical chart is as shown in FIG. 5. As member 32 is forced downward the panel 26 is deflected. At point B on the chart the panel 26 has reached its yield point (i.e., the panel will no longer return to its original form). At point A on the chart the panel 26 has buckled or broken.

From the chart the maximum deflection at the yield point B is represented by $X_1$ and the load or force at yield point B is represented by $Y_1$. The maximum deflection at failure point A is represented by $X_2$ and the load or force at failure point A is represented by $Y_2$.

With the values obtained from the chart, and the physical measurements of the panel, the beam flexural modulus is calculated from the formula:

$$F = \frac{Y_1}{X_1} \times \frac{(L)^3}{4(b)(d)^3}$$

where $Y_1$ is in pounds, $X_1$ is in inches, L is the distance between supports 30 (this distance being 17 inches in this test procedure), $b$ is the panel width in inches, and $d$ is the average panel thickness in inches. The beam flexural modulus is reported in pounds per square inch.

The products of this invention exhibit a beam flexural modulus of at least $0.3 \times 10^6$ p.s.i. at a density of 10 pounds per cubic foot and at least $1 \times 10^6$ p.s.i. at a density of 20 pounds per cubic foot. The correlation between foam density and minimum acceptable beam flexural modulus is given in the formula $$\text{Log}_{10}F = (0.05229)D + 4.9542,$$

where D is the density of the foam in pounds per cubic foot.

The foams of this invention, although particularly suitable for use in metal panel constructions (e.g., steel), are also useful in combination with a variety of other substrates. For example, they will adhere tenaciously to substrates such as fiberglass reinforced polyester, wood, polystyrene, acrylonitrile/butadiene/styrene, polymethylmethacrylate, etc.

Objects and advantages of this invention are further illustrated by the following non-limiting examples, wherein the term "parts" refers to parts by weight unless otherwise indicated.

EXAMPLE 1

A two-part composition is prepared and then mixed together to form a foamed poly(urethane-isocyanurate) product. Part A of the composition was prepared by mixing together the following ingredients to obtain a homogeneous dispersion:

| | Parts By Weight |
|---|---|
| Polyoxypropylene triol (ave. mol. wt. = 600) | 90.0 |
| Polyoxypropylene diol (ave. mol. wt. = 2000) | 4.0 |
| Siloxane alkyleneoxide block copolymer ("L-540", commercially available from Union Carbide) | 0.5 |
| Water | 0.1 |
| Diethylene glycol (mol. wt. = 106) | 3.3 |
| N,N-Dimethylcyclohexylamine | 0.3 |
| "B-25-B" Glass Bubbles (hollow glass spheres having an average particle density of 0.20–0.25 gm/cc. as measured by ASTM D-2840-69; commercially available from 3M Company) | 23.0 |
| Potassium Acetate (trimerization catalyst) | 0.3 |

Part B of the composition was a polymeric isocyanate, "Mondur MRS", commercially available from Mobay Chemical Co., with an equivalent weight of 135. Part A (368 grams) were mixed with 400 grams of Part B at 75°F. for 5 seconds and then the mixture was immediately poured into the mold cavity described hereinbefore with reference to the test procedure for measuring the beam flexural modulus, permitted to cure, and then tested.

The NCO/OH equivalent ratio of the reaction mixture was 1.85/1, and the crosslink density of the cured polymer was one crosslink per 440 atomic weight units. The glass spheres represented approximately 8 percent by volume of the foam.

The sandwich panel construction had a core density of 18 pounds per cubic foot. After exposure to 350°F. for 1 hour the panel exhibited an average change in width of less than 3%. No splits were noted at the foam surface nor did the foam pull away or shrink from the metal substrates.

The properties of the panel (after aging for 1 hour at 350°F.) were as follows:

| | |
|---|---|
| Load at Failure | = 2020 pounds |
| Deflection at Failure | = 0.9 inch |
| Maximum Recoverable Load | = 1750 pounds |
| Deflection at Max. Recoverable Load | = 0.25 inch |
| Beam Flexural Modulus | = $1.3 \times 10^6$ p.s.i. |

The foam of this example, when prepared at a density of 10 pounds per cubic foot and tested as described herein, exhibits a beam flexural modulus of at least $0.3 \times 10^6$ p.s.i., and when prepared at a density of 20 pounds per cubic foot and tested it exhibits a beam flexural modulus of at least $1 \times 10^6$ p.s.i. Also, when prepared at various densities between 10 and 20 pounds per cubic foot, the foam exhibited properties exceeding the minimum values.

EXAMPLE 2

A foam was prepared which corresponded to that of Example 1 except that no hollow glass spheres were included therein.

Part A was the same as Part A of Example 1 except that the glass spheres were not included, and Part B was the same as in Example 1. Part A (300 grams) were mixed with 400 grams of Part B and a sandwich panel construction was formed as described in Example 1.

The core density of the panel was 23 pounds per cubic foot. The NCO/OH equivalent ratio of the reaction mixture was 1.85/1 and the crosslink density was 440 atomic weight units per crosslink.

Although the average panel width decreased only 2% after exposure for one hour at 350°F., there were numerous cracks and splits observed on the surface of the foam which indicated poor heat stability as compared to the product of Example 1.

The properties of the panel of this example were as follows:

```
Load at Failure                      = 1300 pounds
Deflection at Failure                = 0.4 inch
Maximum Recoverable Load             = 1200 pounds
Deflection at Max. Recoverable Load  = 0.3 inch
Beam Flexural Modulus                = 8.8 × 10⁵ p.s.i.
```

This example shows that a foam corresponding to a foam of this invention, but without the inclusion of hollow glass spheres, does not exhibit the very desirable heat stability and beam flexural modulus obtainable with foams of this invention. The difference in properties between the foams of Example 1 and Example 2 is also significant because it shows that foams without the glass spheres, even when compared with foams of the invention which have much lower densities, fail to exhibit the desirable properties obtained by the present invention.

EXAMPLE 3

A foamed poly(urethane-isocyanurate) product of the invention is formed using the following Part A and Part B compositions.

Part A is prepared by mixing the following ingredients to obtain a homogeneous dispersion:

|  | Parts By Weight |
|---|---|
| Polyoxypropylene triol (ave. mol. wt. = 600) | 41.1 |
| Polyoxypropylene diol (ave. mol. wt. = 2000) | 52.8 |
| Siloxane alkyleneoxide block copolymer ("L-540", commercially available from Union Carbide) | 0.5 |
| Water | 0.1 |
| Diethylene Glycol | 3.3 |
| N,N dimethylcyclohexylamine | 0.1 |
| "B-25-B" Glass Bubbles | 40.0 |
| Potassium Acetate | 0.3 |

Part B of the composition was a polymeric isocyanate, Mondur MRS, with an equivalent weight of 135. 532 grams of Part A were mixed with 268 grams of Part B and a sandwich panel construction was formed as described in Example 1.

Core density of the panel was 17.8 pounds per cubic foot. The reaction mixture had an NCO/OH equivalent ratio of 1.5/1 and the crosslink density of the cured polymer was 697 atomic weight units per crosslink. The glass spheres represented approximately 13 percent by volume of the foam.

The panel was exposed to 350°F. for 1 hour and change in the width of the panel was less than 1%. No splits or cracks were observed in the foam nor was there any shrinkage of the foam away from the metal substrates. Mechanical properties of the panel after heat aging were:

```
Load at Failure                      = 1910 pounds
Deflection at Maximum Load           = 1.1 inches
Max. Recoverable Load                = 1500 pounds
Deflection at Max. Recoverable Load  = 0.35 inch
Beam Flexural Modulus                = 9 × 10⁵ p.s.i.
```

The foam of this example, when prepared at a density of 10 pounds per cubic foot and tested as described herein, exhibits a beam flexural modulus of at least 0.3 × 10⁶ p.s.i., and when prepared at a density of 20 pounds per cubic foot and tested it exhibits a beam flexural modulus of at least 1 × 10⁶ p.s.i. The foam also exhibits properties exceeding the minimum properties at densities between 10 and 20 pounds per cubic foot.

EXAMPLE 4

A foamed poly(urethane-isocyanurate) product of the invention is prepared using the following Part A and Part B compositions.

Part A is prepared by mixing the following ingredients to obtain a homogeneous dispersion:

|  | Parts By Weight |
|---|---|
| Polyoxypropylene triol (ave. mol. wt. = 600) | 70.0 |
| Polyoxypropylene diol (ave. mol. wt. = 2000) | 23.9 |
| Siloxane alkyleneoxide block copolymer ("L-540", commercially available from Union Carbide) | 0.5 |
| Water | 0.1 |
| Diethylene Glycol | 3.3 |
| Dibutyltin dilaurate | 0.25 |
| N,N-dimethylcyclohexylamine | 0.3 |
| "B-40-B" Glass Bubbles | 27.9 |

Part B of the composition was a polymeric isocyanate, Mondur MRS, with an equivalent weight of 135. 470 grams of Part A were mixed with 330 grams of Part B and a sandwich panel construction was formed as described in Example 1.

The mixture of components A and B had an NCO/OH equivalent ratio of 1.4/1 and the cured polymer had a crosslink density of 565 atomic weight units per crosslink. The glass spheres represented approximately 10 percent by volume of the foam. The core density of the sandwich panel was 15.8 pounds per cubic foot. Change in width of the panel after exposure to 350°F. for 1 hour averaged less than 1%. No splits or cracks were observed in the surface of the exposed foam. The mechanical properties of the panel after exposure to heat aging were:

```
Load at Failure                      = 1585 pounds
Deflection at Failure                = 0.5 inch
Max. Recoverable Load                = 1550 pounds
Deflection at Max. recoverable load  = 0.35 inch
Beam Flexural Modulus                = 1.1 × 10⁶ p.s.i.
```

The foam of this example, when prepared at a density of 10 pounds per cubic foot and tested as described herein, exhibits a beam flexural modulus of at least 0.3 × 10⁶ p.s.i., and when prepared at a density of 20 pounds per cubic foot and tested it exhibits a beam flexural modulus of at least 1 × 10⁶ p.s.i. The foam also exhibits properties exceeding the minimum properties at densities between 10 and 20 pounds per cubic foot.

EXAMPLE 5

A foam was prepared which corresponded to that of Example 4 except that no hollow glass spheres were included therein.

Part A was the same as Part A of Example 4 except that the glass spheres were not included, and Part B was the same as that in Example 4. Part A (420 grams) were mixed with 379 grams of Part B and a sandwich panel construction was formed as described in Example 1.

The NCO/OH equivalent ratio in the reaction mixture was 1.4/1 and the crosslink density of the cured polymer was 565 atomic weight units per crosslink. The core density of the panel was 25 pounds per cubic foot.

The mechanical properties of the heat aged product were:

| | |
|---|---|
| Load at Failure | = 1550 pounds |
| Deflection at Failure | = 0.3 inch |
| Max. Recoverable Load | = 1500 pounds |
| Deflection at max. recoverable load | = 0.25 inch |
| Beam Flexural Modulus | = 1.4 × 10$^6$ p.s.i. |

This example illustrates that in order to obtain mechanical properties in a foam not containing glass spheres which are similar to the mechanical properties of the foam containing such glass spheres, the density of the foam without spheres must be substantially higher.

EXAMPLE 6

A foamed poly(urethane-isocyanurate) product is prepared in the presence of a fluorochemical foam stabilizer.

Part A is prepared by mixing the following ingredients to obtain a homogeneous dispersion.

| | Parts By Weight |
|---|---|
| Polyoxypropylene triol (ave. mol. wt. = 600) | 70.0 |
| Polyoxypropylene diol (ave. mol. wt. = 2000) | 23.9 |
| Fluorochemical foam stabilizer | 0.5 |
| Water | 0.1 |
| Diethylene glycol | 3.3 |
| Potassium Acetate | 0.3 |
| N,N-dimethylcyclohexylamine | 0.3 |
| "B-25-B" Glass Bubbles | 15.0 |

The fluorochemical foam stabilizer used was prepared by first equipping a 100 liter glasslined kettle with an agitator, heating and cooling coils, vacuum attachment, reflux condenser, nitrogen purge and bottom drain. The kettle is charged with:

| | Parts |
|---|---|
| $C_8F_{17}SO_2N(C_2H_4OH)_2$ | 11.5 |
| $CH_3COC_2H_5$ | 19.2 |

The kettle charge is azeotroped through a decanter to remove adventitious water. A purge of oxygen-free nitrogen is maintained throughout the reaction. The kettle is cooled to 50°C. and 6.7 parts of tolylene diisocyanate and 0.02 parts triethylamine catalyst added. Heating and agitation at 60°C. are continued for 4 hours. 53.8 parts of a polyether block copolymer diol (40% polyethylene oxide, 60 polypropylene oxide; molecular weight 2000 — "Pluronic L-44") are added and heating and agitation at 70°C. are continued for about 8 hours until further tests for isocyanate are negative. Solvent is stripped at 70°C. under about 100 mm Hg pressure to about 80% solids. The kettle temperature is lowered to 50°C., pressure returned to atmospheric, and the contents drained through silk screen into suitable containers.

Part B of the composition was a polymeric isocyanate (Mondur MRS) having an equivalent weight of 135.

A sandwich panel construction was prepared, according to the method outlined in Example 1, by mixing 458 grams of Part A with 342 grams of Part B. This mixture gave an NCO/OH equivalent ratio of 1.4/1 and the cured polymer had a crosslink density of 565 atomic weight units per crosslink. The glass spheres represented approximately 7 percent by volume of the foam.

Core density of the sandwich panel was 15 pounds per cubic foot. After 1 hour at 350°F. the average panel width had decreased less than 1%. No cracks or splits were observed in the heat aged foam. The mechanical properties of this panel were:

| | |
|---|---|
| Load at Failure | = 1900 pounds |
| Deflection at Failure | = 1.1 inches |
| Max. Recoverable Load | = 1600 pounds |
| Deflection at max. recoverable load | = 0.35 inch |
| Beam Flexural Modulus | = 9 × 10$^5$ p.s.i. |

The foam of this example, when prepared at a density of 10 pounds per cubic foot and tested as described herein, exhibits a beam flexural modulus of at least 0.5 × 10$^6$ p.s.i., and when prepared at a density of 20 pounds per cubic foot and tested it exhibits a beam flexural modulus of at least 2 × 10$^6$ p.s.i. The foam also exhibits the properties exceeding the minimum properties in the range of 10 to 20 pounds per cubic foot density.

EXAMPLE 7 a foamed poly(urethane-isocyanurate) product of the invention is prepared using the following Part A and Part B compositions:

Part A is prepared by mixing the following ingredients:

| | Parts By Weight |
|---|---|
| Polyoxypropylene triol (ave. mol. wt. = 600) | 70 |
| Polyoxypropylene diol (ave. mol. wt. = 2000) | 23.9 |
| Siloxane alkyleneoxide block copolymer ("L-540", commercially available from Union Carbide) | 0.5 |
| Water | 0.1 |
| Diethylene Glycol | 3.3 |
| N,N-dimethylcyclohexylamine | 0.3 |
| Potassium Acetate | 0.3 |
| "B-25-B" Glass Bubbles | 6.0 |

Part B of the composition was a polymeric isocyanate, Mondur MRS, with an equivalent weight of 135. 448 grams of Part A were mixed with 352 grams of Part B at 75°F. for 5 seconds and a sandwich panel construction was then prepared as described in Example 1. The reaction mixture of components A and B gave an NCO-/OH equivalent ratio of 1.4/1. The crosslink density of the cured polymer was 565 atomic weight units per crosslink. The glass spheres represented approximately 2 percent by volume of the foam.

Core density of the sandwich panel was 11.7 pounds per cubic foot. The average width of the panel varied less than 1% while exposed to 350°F. for 1 hour and no splits or cracks were observed in the surface of the foam. The mechanical properties of the heat aged panel were:

| | |
|---|---|
| Load at Failure | = 1400 pounds |
| Deflection at Failure | = 1.25 inches |
| Maximum Recoverab le Load | = 810 pounds |
| Deflection at Max. Recoverable Load | = 0.25 inch |
| Beam Flexural Modulus | = 6.6 × 10$^5$ p.s.i. |

The foam of this example, when prepared at a density of 10 pounds per cubic foot and tested as described herein, exhibits a beam flexural modulus of at least 0.3 × 10$^6$ p.s.i., and when prepared at a density of 20 pounds per cubic foot and tested it exhibits a beam flexural modulus of at least $1 \times 10^6$ p.s.i.

EXAMPLE 8

A foam was prepared which corresponded to that of Example 7 except that no hollow glass spheres were included in Part A. Part B was the same as in Example 7.

Part A (420 grams) were mixed with 380 grams of Part B and a sandwich panel construction was formed with steel substrates as described in Example 1.

The NCO/OH equivalent ratio of the reaction mixture and the crosslink density of the cured polymer were equivalent to those of Example 7.

The core density of the panel was 13.4 pounds per cubic foot. Although the average panel width decreased only 2% after exposure for one hour at 350°F., there were numerous cracks and splits observed on the surface of the foam and in some areas the foam had pulled away from the steel substrates. This indicated that the foam had poor heat stability as compared to the product of Example 7.

The properties of this panel were:

| | |
|---|---|
| Load at Failure | = 1210 pounds |
| Deflection at Failure | = 0.5 inch |
| Maximum Recoverable Load | = 500 pounds |
| Deflection at Maximum Recoverable Load | = 0.3 inch |
| Beam Flexural Modulus | = $4.0 \times 10^5$ p.s.i. |

This foam fails to exhibit the minimum required beam flexural modulus under the density-flexural modulus formula described above.

EXAMPLE 9

A foamed poly(urethane-isocyanurate) product of the invention is prepared using Part A and Part B components. Part A was prepared by mixing together the following ingredients to obtain a homogeneous dispersion:

| | Parts By Weight |
|---|---|
| Polyoxypropylene triol (ave. mol. wt. = 600) | 41.1 |
| Polyoxypropylene diol (ave. mol. wt. = 2000) | 52.8 |
| Siloxane alkyleneoxide block copolymer ("L-540") | 0.5 |
| Water | 0.1 |
| Diethylene Glycol | 3.3 |
| N,N-dimethylcyclohexylamine | 0.3 |
| Potassium Acetate | 0.3 |
| "B-40-B" Glass Bubbles (hollow glass spheres commercially available from 3M Company; average particle density of 0.3–0.4 grams per cubic centimeter) | 19.0 |

Part B was a polymeric isocyanate, Mondur MRS, with an equivalent weight of 135. 496 grams of Part A were mixed with 304 grams of part B at 75°F. for 5 seconds and the mixture poured into a suitable mold cavity.

The reaction mixture had an NCO/OH equivalent ratio of 1.5/1, and the cured polymer had a crosslink density of 570 atomic units per crosslink.

The core density of the panel was 11 pounds per cubic foot. The panel was heat stable and exhibited very good beam flexural moduli.

EXAMPLE 10

A foam was prepared which corresponded to that of Example 9 except that no hollow glass spheres were included in Part A. Part B was the same as in Example 9.

Part A and Part B were mixed and reacted at an NCO/OH equivalent ratio of 1.5/1 and in such a manner that the crosslink density of the cured polymer was 570 atomic weight units per crosslink. The core density of the panel prepared was 16 pounds per cubic foot. The product was not as heat stable as the product of Example 9 and it exhibited mechanical properties which were much inferior to those of the product of Example 9.

I claim:

1. A poly(urethane-isocyanurate) foam comprising a continuous matrix of a reaction product and, within said matrix, a discontinuous phase of hollow glass spheres having an average diameter of 5 to 500 microns, said reaction product being formed by the reaction of organic polyisocyanate and organic polyol in the presence of foam stabilizer, isocyanate trimerization catalyst and blowing agent, the NCO/OH equivalent ratio being 1.2/1 to 2.5/1, and the average molecular weight of the polyol being in the range of 600 to 1500, said foam stabilizer comprising a fluorochemical having the formula $(R_f)_m Q_z(H)_n$ wherein $R_f$ is a fluorinated, monovalent, aliphatic radical, H is an active hydrogen atom, Q is a linkage free of active hydrogen atoms having a valence equal to $m+n$, $m$ is an integer of at least 1, $n$ is an integer of at least 2, and $z$ is an integer of from 1 to 3, said polymeric reaction product having isocyanate-derived linkages consisting essentially of isocyanurate and urethane linkages; wherein the crosslink density of said reaction product is in the range of about one crosslink per 400 to 800 atomic weight units; wherein said glass spheres are 2 to 20 percent by volume of said foam; and wherein said foam has a density in the range of 10 to 20 pounds per cubic foot; and wherein said foam exhibits a beam flexural modulus at least as great as that calculated from the formula $Log_{10}F = (0.05229)D + 4.9542$ wherein F is the beam flexural modulus in pounds per square inch and D is the density of the foam in pounds per cubic foot.

2. A poly(urethane-isocyanurate) foam in accordance with claim 1, wherein said NCO/OH equivalent ratio is in the range of 1.4/1 to 1.8/1.

3. A poly(urethane-isocyanurate) foam in accordance with claim 1, wherein said glass spheres represent about 4 to 10 percent by volume of said foam.

4. A poly(urethane-isocyanurate) foam in accordance with claim 1, wherein said polyol is a polyoxyalkylene polyol, wherein at least 95% of the oxyalkylene units are oxypropylene units, and wherein the average molecular weight of said polyol is in the range of about 650 to 900.

5. A poly(urethane-isocyanurate) foam in accordance with claim 1, wherein the crosslink density of said reaction product is in the range of about 450 to 650.

6. A panel construction comprising two substrates which define a cavity therebetween, said cavity containing a poly(urethane-isocyanurate) foam which is adhered to each of said substrates, said foam comprising a continuous matrix of a reaction product and, within said matrix, a discontinuous phase of hollow glass spheres having an average diameter of 5 to 500 microns, said reaction product being formed by the reaction of organic polyisocyanate and organic polyol in the presence of foam stabilizer, isocyanate trmerization catalyst and blowing agent, the NCO/OH equivalent ratio being 1.2/1 to 2.5/1 and the average molecular weight of the polyol being in the range of 600 to 1500, said foam stabilizer comprising a fluorochemical having the formula $(R_f)_m Q_z(H)_n$ wherein $R_f$ is a fluorinated, monovalent, aliphatic radical, H is an active hydrogen atom, Q is a linkage free of active hydrogen atoms having a valence equal to $m+n$, $m$ is an integer of at least 1, $n$ is an integer of at least 2, and $z$ is an integer of from 1 to 3, said polymeric reaction product having isocyanatederived linkages consisting essentially of isocyanurate and urethane linkages; wherein the crosslink density of said reaction product is in the range of about one crosslink per 400 to 800 atomic weight units; wherein said glass spheres are 2 to 20 percent by volume of said foam and wherein said foam has a density in the range of 10 to 20 pounds per cubic foot; and wherein said foam exhibits a beam flexural modulus at least as great as that calculated from the formula $Log_{10}F=(0.05229)D+4.9542$ where F is the beam flexural modulus in pounds per square inch and D is the density of the foam in pounds per cubic foot.

7. A panel construction in accordance with claim 6, wherein said NCO/OH equivalent ratio is in the range of 1.4/1 to 1.8/1.

8. A panel construction is accordance with claim 6, wherein said glass spheres represent about 4 to 10 percent by volume of said foam.

9. A panel construction in accordance with claim 6, wherein said substrates are comprised of metal.

10. A panel construction in accordance with claim 6, wherein said substrates are comprised of steel.

11. A composition which, when mixed with organic polyisocyanate, reacts to form a poly(urethane-isocyanurate) foam, said composition comprising:
   a. organic polyol having a molecular weight in the range of 600 to 1500;
   b. isocyanate trimerization catalyst;
   c. blowing agent;
   d. hollow glass spheres having an average diameter of 5 to 500 microns;

wherein said composition, when mixed with an amount of organic polyisocyanate sufficient to form a mixture wherein the NCO/OH equivalent ratio is in the range of 1.2/1 to 2.5/1, reacts to form a tough, non-friable foamed product comprising a continuous matrix of poly(urethane-isocyanurate) polymer and, within said matrix, a discontinuous phase of said glass spheres; wherein said polymer has a crosslink density of about one crosslink per 400 to 800 atomic weight units; and wherein said glass spheres represent about 2 to 20 percent by volume of said foamed product.

12. A composite article comprising a substrate having adhered to at least one surface thereof a reinforcement layer comprising the poly(urethane-isocyanurate) foam of claim 1.

* * * * *

UNITED STATES PATENT AND TRADEMARK OFFICE
CERTIFICATE OF CORRECTION

PATENT NO. : 3,993,608
DATED : November 23, 1976
INVENTOR(S) : JAMES N. WELLS

It is certified that error appears in the above-identified patent and that said Letters Patent are hereby corrected as shown below:

Column 5, line 66, "fluorine-contaiaing" should read -- fluorine-containing --.

Column 6, line 17, "J. Am. Chem. Soc., 49," should read -- J. Am. Chem. Soc., 49, --.

Column 6, line 22, "active hydrogen atoms" should read -- "active hydrogen atoms" --.

Column 10, line 13, "$CF_3(CF_2)_7SO_2N(CH_2(CH_2)_5SH$" should read -- $CF_3(CF_2)_7SO_2N(CH_3)(CH_2)_5SH$ --.

Column 11, line 14, "$CF_3CF(CF_2H)_{13}CONHCH_2CH(OH)CH_2OH$" should read -- $CF_3CF(CF_2H)(CF_2)_{13}CONHCH_2CH(OH)CH_2OH$ --.

Column 13, line 68, "beam flexural modulus." should read -- "beam flexural modulus" --.

Column 15, lines 26-27, "beam flexural modulus" should read -- "beam flexural modulus" --.

Column 15, lines 36-37, "beam flexural modulus" should read -- "beam flexural modulus" --.

Column 15, lines 38-39, "beam flexural modulus" should read -- "beam flexural modulus" --.

Column 15, lines 42-43, "beam flexural modulus" should read -- "beam flexural modulus" --.

Colunn 16, line 45, "beam flexural modulus" should read -- "beam flexural modulus" --.

Column 16, lines 47-48, "beam flexural modulus" should read -- "beam flexural modulus" --.

Column 17, line 42, "Mondur MRS," should read -- "Mondur MRS", --.

UNITED STATES PATENT OFFICE
CERTIFICATE OF CORRECTION

Patent No. 3,993,608                    Dated Nov. 23, 1976

Inventor(s) James N. Wells

It is certified that error appears in the above-identified patent and that said Letters Patent are hereby corrected as shown below:

Column 17, line 67, "beam flexural modulus" should read -- "beam flexural modulus"--.

Column 18, lines 1-2, "beam flexural modulus" should read -- "beam flexural modulus"--.

Column 18, line 25, "Mondur MRS," should read --"Mondur MRS", --.

Column 18, line 49, "beam flexural modulus" should read -- "beam flexural modulus"--.

Column 18, lines 51-52, "beam flexural modulus" should read --"beam flexural modulus"--.

Column 19, line 62, "(Mondur MRS)" should read --("Mondur MRS")--.

Column 20, line 15, "beam flexural modulus" should read -- "beam flexural modulus"--.

Column 20, line 67, "beam flexural modulus" should read -- "beam flexural modulus"--.

Column 21, lines 1-2, "beam flexural modulus" should read -- "beam flexural modulus"--.

UNITED STATES PATENT OFFICE
CERTIFICATE OF CORRECTION

Patent No. 3,993,608          Dated Nov. 23, 1976

Inventor(s) James N. Wells

It is certified that error appears in the above-identified patent and that said Letters Patent are hereby corrected as shown below:

Column 21, line 54, "Mondur MRS" should read --"Mondur MRS"--.

Column 21, line 68, "beam flexural moduli." should read --"beam flexural moduli".--.

Signed and Sealed this

Twenty-fourth Day of May 1977

[SEAL]

Attest:

RUTH C. MASON
Attesting Officer

C. MARSHALL DANN
Commissioner of Patents and Trademarks